March 24, 1953 — H. EISNER — 2,632,491
ANTISKID ATTACHMENT
Filed June 3, 1950
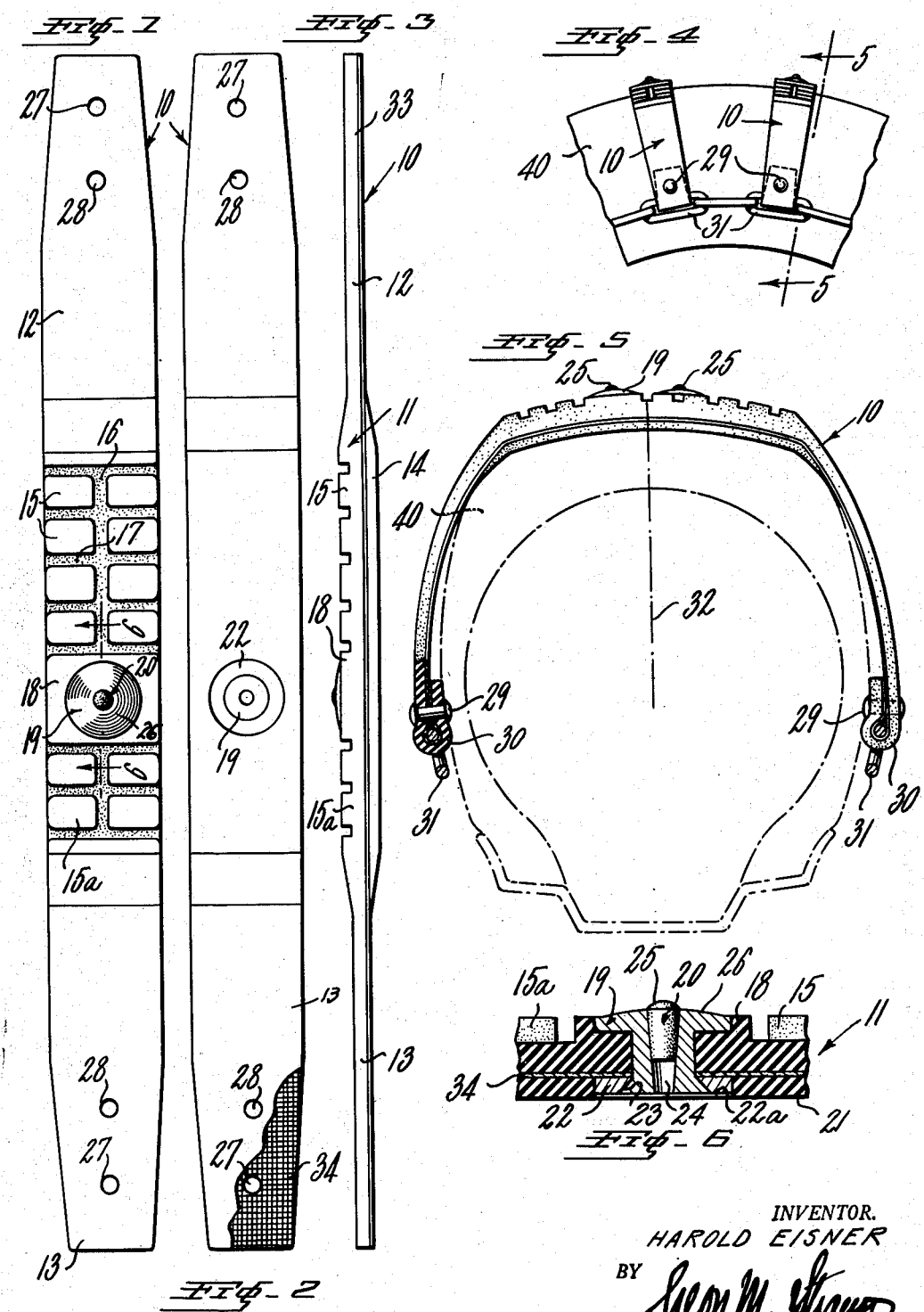
INVENTOR.
HAROLD EISNER
BY Patented Mar. 24, 1953

2,632,491

UNITED STATES PATENT OFFICE 2,632,491

ANTISKID ATTACHMENT

Harold Eisner, Au Marronier, Prangins, Switzerland, assignor to Hermann R. Raz-Ammann's Wwe. & Co., Thun, Switzerland Application June 3, 1950, Serial No. 165,902

2 Claims. (Cl. 152—222)

This invention relates to anti-skid devices or attachments for the wheels of automotive and similar vehicles to prevent same from slipping or skidding, preferably on icy and muddy roads.

It is one of the objects of the present invention to provide means affording the combination of resilient and improved gripping actions in antiskid devices whereby relative movement between the elements of which such devices are composed may take place.

It is another object of the present invention to provide means offering the possibility of anchoring anti-skid means on a relatively resilient base or carrier which inherently contains further anti-skid means of a character different from that of the first mentioned anti-skid means.

Another object of the present invention is to provide means facilitating the employment of the new anti-skid device on any size or type of tire to which it may be readily applied and conformed to fit the particular shape thereof.

Still a further object of the present invention is to provide means ensuring sufficient movability for the anti-skid device so as to enable the same to follow the yieldability of the tire of a vehicle, particularly when in use.

Yet a further object of the present invention is to provide means contributing to a substantial increase of the life of the vehicle tire, offering considerable resistance to high stresses and ensuring reliable construction and efficient operation of the anti-skid structure.

A still further object of the present invention is to provide means permitting the accommodation of anti-skid elements of various degrees of hardness or wear resistance in the body or base of the anti-skid device.

Still a further object of the present invention is to provide means conducive to a simplified anti-skid structure of the aforesaid character which may be easily manufactured by mass production methods and can be applied to extend across the tread surface of a tire without damaging the latter; and to provide further means permitting the positioning of the anti-skid elements at predetermined location of the antiskid base or body, whereby the latter may be attached to said tread surface of said tire while the anti-skid elements or means are preferably arranged in staggered relation to each other and relatively to the tire, although only one and the same type and shape of the anti-skid structure is employed.

Still another object of the present invention is to provide means reducing during use, the noise of anti-skid devices to a minimum and minimizing the friction of such devices with the tread surface of the tire of the vehicle.

Another object of the invention resides in the provision of means enabling the manufacture of the base or body of the anti-skid device independent of the wear-resistant element or elements, which may be readily associated with said body in accordance with the specific requirements of the practice, as to the load of the vehicle, shape of the tire, character of the road (for example, mountain road) on which the antiskid device is to be used, etc.

With the above and other objects in view, the invention will be hereinafter more fully described and the combination and arrangement of parts will be shown in the accompanying drawing and pointed out in the claims which form part of the specification.

In the drawing:

Fig. 1 is a top plan view of an anti-skid attachment made in accordance with this invention.

Fig. 2 is a bottom plan view of the attachment of Fig. 1.

Fig. 3 is a side elevational view of the attachment of Fig. 1.

Fig. 4 shows the anti-skid attachment of Fig. 1 as applied to a tire of an automobile.

Fig. 5 is an enlarged view partly in section and taken along line 5—5 of Fig. 4.

Fig. 6 is an enlarged fragmentary sectional view taken along line 6—6 of Fig. 1.

Referring now more particularly to the drawing there is shown in Figs. 1 to 3 an anti-skid body or attachment 10 made principally of stretchable, preferably rubber or other plastic material, and in accordance with this invention. This anti-skid attachment consists principally of the median part 11 and the extensions or outer parts 12 and 13. The median part 11 is reinforced at 14 relatively to the bendable extensions 12 and 13. The upper surface of median part 11 is provided with a plurality of block-shaped elements 15, 15a which terminate in opposed lateral ends and are separated from each other by longitudinal grooves 16 and transverse grooves 17.

As seen in Fig. 1 there has been provided on the longitudinal portion 11 a larger rectangular-shaped block 18 which is substantially of the same height as the blocks 15, 15a but is larger than each of said blocks 15, 15a and forms an anchorage for a sintered carbide alloy element 20 which is fixed in a rivet-like member 19, This member passes through block 18 of median portion 11 and terminates at the underface 21 thereof whereby the rivet-like member 19 is retained by a securing ring 22 recessed at 22a with respect to underface 21, as can be seen from Fig. 6.

The rivet-like member 19 has a conical end 23 which is held in position by said securing ring 22. It is well understood that tapered member 20 of carbide alloy is driven under friction into a suitable opening 24 of member 19 and is provided with a rounded head 25 which substantially conforms to the upper rounded surface 26 of rivet member 19.

As will be further seen from Fig. 1 there are eight blocks 15 arranged on one side of member 20 and four blocks 15a on the opposite side of member 20, all these blocks being positioned on the median portion 11 of the anti-skid attachment.

As indicated in Fig. 1, the rubber extensions 12 and 13 may be provided with suitable perforations 27, 28, which may be brought in registry with each other and penetrated by rivets 29 as seen in Fig. 5, whereby end loops 30 are obtained which are adapted to receive chain links 31. Thus the anti-skid attachment 10 may be placed over the tire 40 of a wheel of an automobile and anchored thereon laterally between chain links 31.

Since the blocks 15 and 15a are arranged not symmetrically with respect to the carbide alloy metal member 20 it will be readily recognized from Figs. 4 and 5 that the anti-skid attachment bodies 10 may be arranged in alternate relation to each other on the tire 40, whereby the ends 25 of adjacent carbide alloy elements 20 will extend alternately a distance from the center line 32 of the tire as illustrated in Fig. 5 and in staggered relation.

It is self-understood that the perforations 27, 28 may be provided in the lateral extensions 12 and 13 a predetermined distance from each other to suit the particular requirements for anchoring the attachments. Consequently, the perforations 27 and 28 may be placed on any location along lateral extensions 12 and 13 and then brought in registry with each other for riveting purposes.

It is further to be mentioned that body 10 is preferably reinforced adjacent its base by a layer 33 of canvas or similar pliable reinforcing material 34 and it may further be mentioned that such canvas layers 33 may be provided in lengthwise direction of body 10 and at different levels thereof.

It goes without saying that the tread surface of the anti-skid attachment consisting of the blocks 15, 15a, 18 to 20, inclusive, may also form the tread surface of the tire itself, whereby the anti-skid element 20 may be arranged in spaced apart relation to each other along the surface of the tire.

It can thus be seen that there has been provided according to the invention a substantially flat body of compressible and stretchable material, one surface of said body being provided with a tread surface, and wear-resistant means of sintered carbide alloy anchored in said body, said tread surface including a plurality of block-shaped elements separated from each other at the level of said tread surface, said wear-resistant means extending adjacent said block-shaped elements and projecting to said tread surface.

It will be further noted that the tread surface may provide any suitable profiled area and that the blocks 15, 15a and 18 may assume various shapes and configurations, always keeping in mind that they provide a certain shape with respect to each other and with respect to the wear-resistant anti-skid element or elements arranged intermediate on said block or blocks.

The element or shape 20 hereinabove referred to consists preferably of cemented or sintered hard metal carbide, such as cemented tungsten-carbide base metal having a degree of hardness of approximately 78 Rockwell C (150 kg. load) corresponding to 88–99 Rockwell A (60 kg. load).

It is well apparent that other hard metal carbides (made of cobalt, chromium, etc) may be employed and that tungsten carbide shape 20 may be embedded in or associated with the attachment 10 in any other suitable manner.

Although the invention has been described with reference to a certain specific embodiment thereof, it is to be distinctly understood that various modifications and adaptations of the arrangement herein disclosed may be made as may readily ocur to persons skilled in the art without constituting a departure from the spirit and scope of the invention as defined in the objects and in the appended claims.

Having thus described the invention, what is claimed as new and desired to be secured by Letters Patent, is:

1. An anti-skid attachment comprising an elongated body of rubber material having outer extensions and a median portion having lateral ends, the surface of said median portion being grooved to form first and second groups of gripping blocks spaced from each other and separated by an anchoring block, and wear resistant means secured in said anchoring block and projecting beyond the outer surface of said gripping blocks and said anchoring block, said anchoring block being positioned off center with respect to said median portion and intermediate the lateral ends thereof.

2. An anti-skid attachment comprising an elongated stretchable body having outer extensions and a median portion terminating in opposed lateral ends, the surface of said median portion being profiled to form first and second groups of gripping blocks spaced from each other, an anchoring block intermediate said gripping blocks, at least one rivet, said rivet having a tapered central bore and being carried by said anchoring block, and wear-resistant means embracingly received and supported within said tapered bore and projecting beyond the outer surface of said gripping blocks and said anchoring block, said anchoring block being positioned off center with respect to said median portion and said lateral ends thereof.

HAROLD EISNER.

REFERENCES CITED

The following references are of record in the file of this patent:

UNITED STATES PATENTS

| Number | Name | Date |
| --- | --- | --- |
| 2,167,277 | Kaiser | July 25, 1939 |
| 2,477,601 | Hanson | Aug. 2, 1949 |
| 2,498,523 | Bergen | Feb. 21, 1950 |

FOREIGN PATENTS

| Number | Country | Date |
| --- | --- | --- |
| 12,781 | Great Britain | 1906 |
| 325,322 | Great Britain | Feb. 20, 1930 |